United States Patent
Gibson et al.

[19]

[11] Patent Number: 5,987,786
[45] Date of Patent: Nov. 23, 1999

[54] GUIDE BAR MOUNT FOR A TREE HARVESTER

[75] Inventors: Duane M. Gibson, Milwaukie; Christopher David Seigneur, West Linn, both of Oreg.

[73] Assignee: Blount, Inc., Portland, Oreg.

[21] Appl. No.: 09/169,895

[22] Filed: Oct. 12, 1998

[51] Int. Cl.$^6$ .............................. A01G 23/08; B23B 57/02
[52] U.S. Cl. ........................... 37/302; 144/34.1; 144/4.1; 30/387
[58] Field of Search ............................. 30/381, 386, 387; 144/4.1, 24.13, 34.1, 343; 414/739; 37/302

[56] References Cited

U.S. PATENT DOCUMENTS

| | | |
|---|---|---|
| 2,327,233 | 8/1943 | Wolf . |
| 2,838,833 | 6/1958 | Richardson . |
| 2,839,096 | 6/1958 | Cutrone . |
| 2,845,967 | 8/1958 | Hutchinson . |
| 2,888,964 | 6/1959 | Mall . |
| 2,897,856 | 8/1959 | Carlton . |
| 4,315,370 | 2/1982 | Horne .......................................... 30/386 |
| 5,093,998 | 3/1992 | Seigneur et al. ........................... 30/387 |
| 5,709,254 | 1/1998 | Argue .................................... 144/4.1 X |

*Primary Examiner*—Robert Pezzuto
*Attorney, Agent, or Firm*—Robert L. Harrington

[57] ABSTRACT

A guide bar mounting arrangement for a tree harvester. The tail end of the guide bar is provided with a center slot and pin receiving slot at each side thereof. A sliding block has a center boss and pins permanently or removably mounted therein at the sides of the boss and the combination is slidably mounted in a fixture or base member fixedly secured to the harvester adjacent a drive sprocket. The guide bar is fitted to the sliding block center slot receiving a center boss of the sliding block and the pin receiving slots engaging the pins of the sliding block. A saw chain is entrained around the guide bar and drive sprocket and the sliding block moved relative to the sprocket to tension the saw chain. The sliding block is forced against the base member to clamp the bar in position.

8 Claims, 3 Drawing Sheets

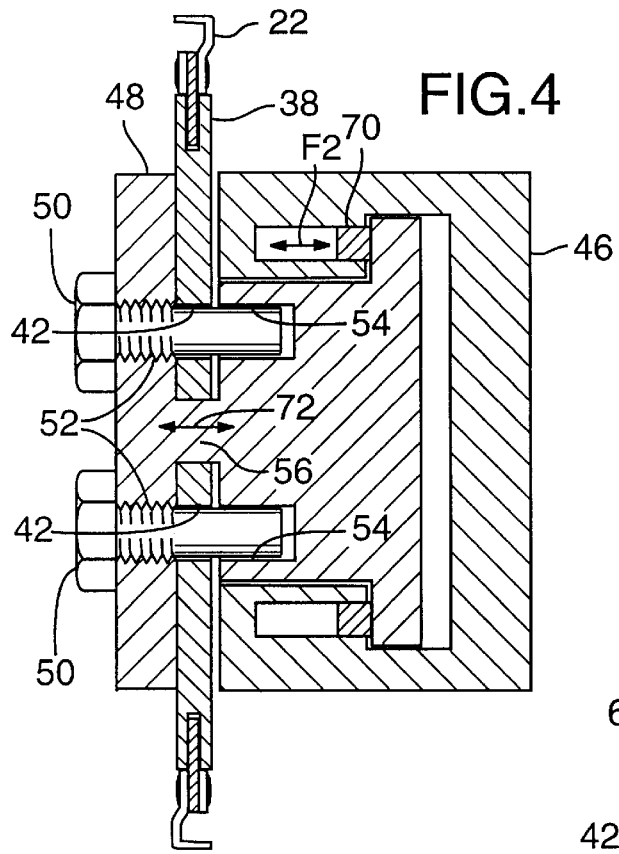
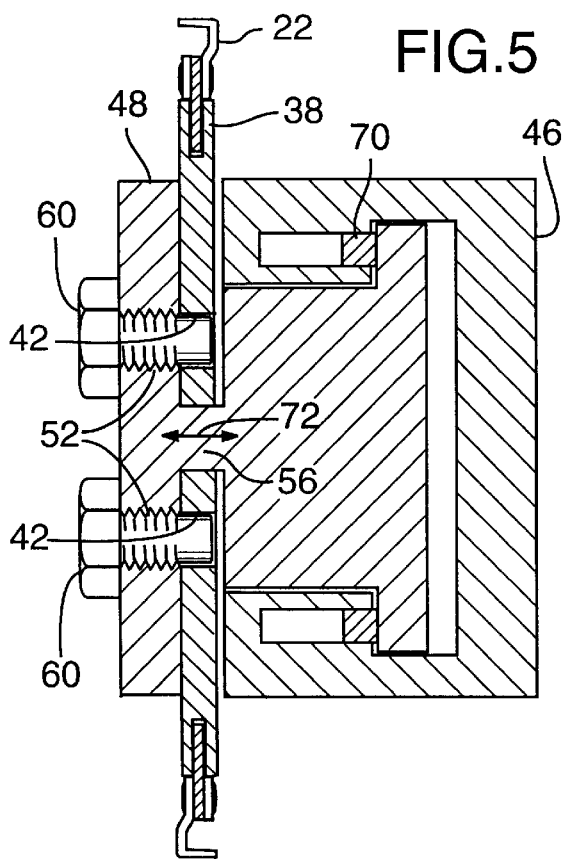
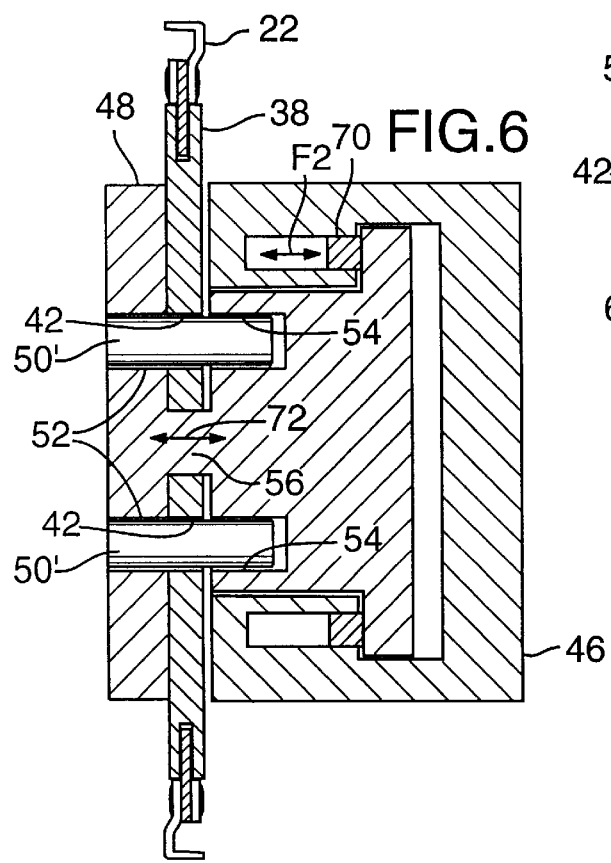

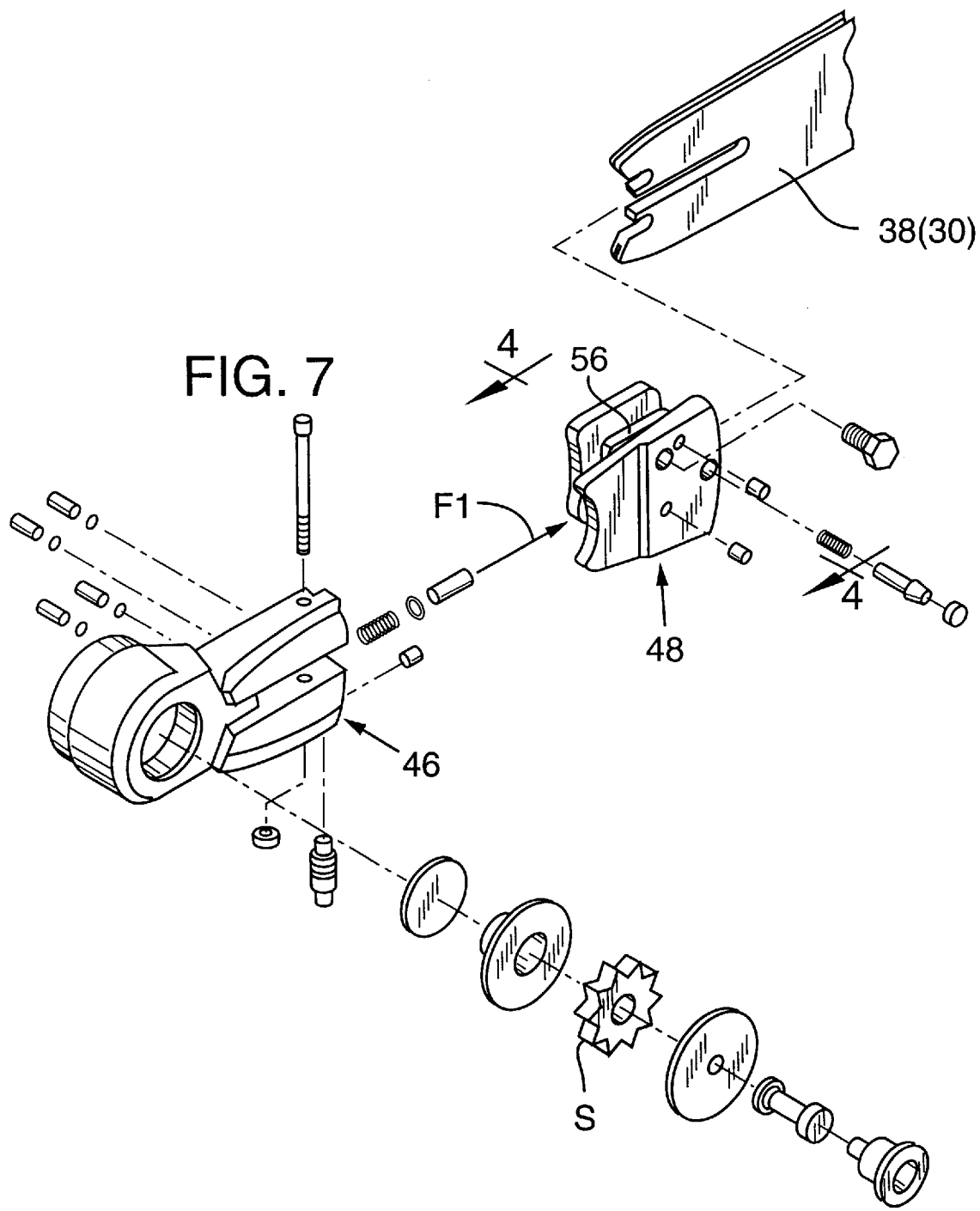

5,987,786

GUIDE BAR MOUNT FOR A TREE HARVESTER

FIELD OF THE INVENTION

This invention relates to a chain saw mounted onto a tree harvester and more particularly it relates to the mechanism for mounting the guide bar of the chain saw to the tree harvester.

BACKGROUND OF THE INVENTION

Tree harvesters are of many different types. In general they include a vehicle, a movable arm or boom extended from the vehicle and a chain saw mounted to the distal end of the boom. The chain saw is mechanically and remotely maneuvered into position against the base of the tree and with a forceful sweeping motion the bar and chain cut into and through the tree trunk.

Chain saws, whether manual or tree harvester chain saws, have similarities in the manner by which they are mounted to the power head of the saw. The bar is elongated and in combination with a drive sprocket mounted to the power head of the chain saw defines an oval guide path for the saw chain. The guide bar is mounted to the power head with the bar's tail end adjacent the drive sprocket. The bar is initially mounted to be slidable toward and away from the drive sprocket. The chain is mounted onto the sprocket and guide bar and then the guide bar is slidably moved away from the sprocket to tension the chain. When the desired tension is achieved, the guide bar is clamped to the power head and thus at the desired position relative to the sprocket.

To allow for such sliding movement, the tail of the bar has an elongated mounting slot. In the manual chain saw, a pair of spaced apart bolts fixed to the power head protrude through the slot to keep the bar properly aligned but allow axial sliding of the bar. When the bar is properly tensioned, nuts threadably mounted to the bolts clamp the bar in place.

In a tree harvester, the force required to tension the much larger chain is frequently provided by hydraulic tensioners. In such cases, rather than bolts, the bar is mounted on a mounting apparatus including a base and a sliding block having a boss that fits into the mounting slot. The base is fixedly mounted to the power head and the block is slidably mounted to the base and is slid forward relative to the base and then clamped in place by hydraulics.

A problem for the harvester bar is the bending moment that is applied to the bar as the bar is forced through a tree trunk. Pivoting of the bar relative to the boom is resisted by the boss of the block that is fitted to the mounting slot of the bar and the applied force can literally split the bar. To prevent such splitting, the bar is provided with bolt holes at each side of the slot and the bar is additionally bolted to the sliding block. This solves the problem of the bar splitting but creates a mounting problem.

In order to replace the bar, the bolts have to be removed before the bar can be slid free of the boss. In mounting a replacement bar, following sliding of the bar onto the boss, the bolts have to be reapplied through the bolt holes in the bar and into the block.

The problem encountered is in the time it takes to unbolt and rebolt the bar for each bar change and even of greater concern is the human factor of simply not applying the bolts, e.g., as a result of carelessness, or on occasion a bolt or bolts are lost during the changeover (dropped in mud or snow) or simply due to hardship, e.g., an operator making the change over in 20 degree below zero weather intentionally leaving the bolts off.

BRIEF DESCRIPTION OF THE INVENTION

The problems explained above are substantially eliminated by slotting the bolt holes to open the hole to the tail of the bar in the same manner as the existing mounting slot. The bolts can be permanently installed on the block and the bar simply slid into engagement with the bolts as well as the centered boss. A releasable clamp secures the block to its base and the bar is thereby secured to the power head. The sole purpose of the bolts, i.e., the prevention of splitting, is fully retained by this improvement.

Following is a more complete list of the perceived advantages of the invention:
1. Reduces the time to change the bar.
2. Eliminates the need to carry a wrench.
3. Eliminates lost wrenches and pins when dropped in snow or brush.
4. Eliminates temptation to operate the bar with only one pin because the other was lost.
5. Allows for a fixed pin or other shape that will not loosen with use like the threaded pins. (Loose pins can develop enough movement to result in bar breakage.)
6. Allows the pin to be supported on both ends for increased stability because it does not have to be removed. (Some prior art pins are made short and only supported on one end to simplify the removal and installation.)
7. Allows the bar to slide out of the clamp when the chain is accidentally broken and the bar and chain are stuck in the tree. This decreases the chance of bar and mounting pad breakage that results when the harvester head is forcibly withdrawn from the tree.
8. Allows the bar to slide out of the clamp when the chain is purposely broken by the operator because the bar and chain are stuck in the tree. This decreases the chances of bar and mounting pad breakage that would result when the harvester head is forcibly withdrawn from the tree.

The invention and its advantages will be further understood upon reference to the following detailed description and accompanying drawings.

BRIEF DESCRIPTION OF THE DRAWINGS

FIG. 4 is a cross section view of the mounting structure mounting the guide bar to the tree harvester of FIG. 2 as if taken on view lines 4—4 of FIG. 7;

FIG. 5 is a view similar to FIG. 4 showing another mounting arrangement;

FIG. 6 illustrates a modification to the mounting structure of FIG. 4 permitted by the bar of FIG. 3; and FIG. 7 is a perspective view illustrating the mounting structure with its various components in exploded relation.

DESCRIPTION OF THE PREFERRED EMBODIMENT

Figure 2:
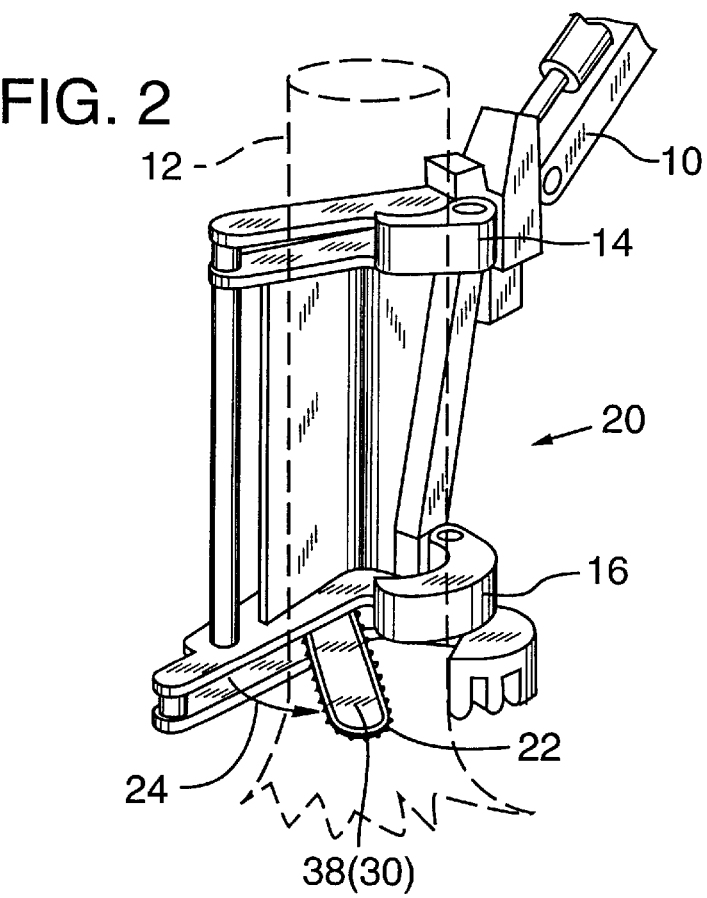
FIG. 2 is a view of a portion of a tree harvester.

FIG. 2 illustrates a boom portion 10 of a tree harvester. The boom portion 10 is mounted to a mobile vehicle (not shown). A harvester head 20 mounted to the boom includes a chain saw power head that rotatably drives a drive sprocket which propels the saw chain 22 around a guide bar 38 (30). Basically the harvester head 20 is movable to be positioned against a tree 12 that is to be felled and has clamping mechanisms 14, 16 that will clamp the harvester head 20 to the tree 12. The guide bar 38 (30) around which the saw chain 22 is entrained is then pivoted as indicated by arrow 24 to cut through the trunk of the tree 12. A large force is imparted against the guide bar 38 (30) during this operation and therefore the guide bar 38 (30) must be suitably mounted and supported in the tree harvester.

Figure 1:
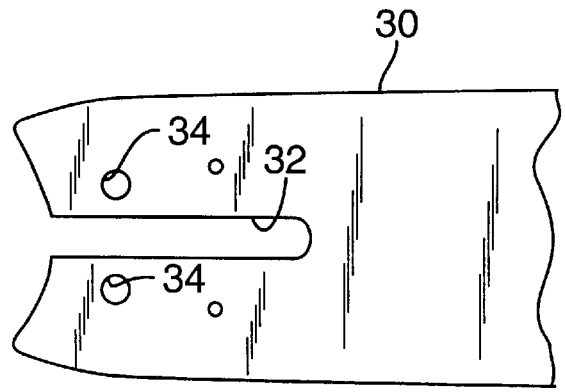
FIG. 1 is a view of a guide bar of the prior art.

FIG. 1 illustrates a guide bar 30 of the prior art that has been used and is mountable in the tree harvester. A center slot 32 is provided in the tail portion of the guide bar 30. Through bores 34 are provided in the tail portion of the guide bar 30 and are positioned on each side of the center slot 32.

Figure 3:
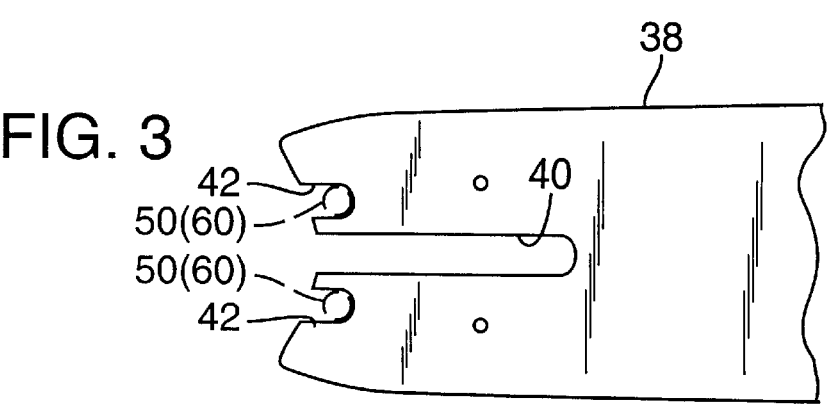
FIG. 3 is a view of a guide bar of the present invention.

FIG. 7 illustrates the mounting apparatus by which the guide bar of either FIGS. 1 or 3 is mounted to the tree harvester of FIG. 2. The mounting apparatus includes a base or base member 46 which is fixed to the power head of the harvester head 20 of FIG. 2. A sprocket S driven by the power head is mounted at the rear of the base in the circular opening as indicated and in alignment with a guide bar 38 (30) mounted in sliding block 48. The relationship of the guide bar 38 (30), sliding block 48 and base member 46 when assembled is illustrated in the section view of FIG. 4.

The mounting or the removal of the guide bar 30 to the tree harvester of FIG. 2 (as differentiated from bar 38) requires that the pins (bolts) 50 of FIG. 4 (or the pins (bolts) 60 of FIG. 5) be removed in order to remove or install the guide bar 30. Installation of the guide bar 30 is accomplished by removing the pins 50 (60). The guide bar 30 is then slid in between the sliding block 48 and the base member 46 with the center slot 32 of bar 30 (FIG. 1) receiving a shoulder portion (boss) 56 of the sliding block 48. The bores 34 of the guide bar 30 are aligned with the threaded bores 52 of the sliding block 48. The pins 50 (60) are installed in the bores 52 with the pins extending through the bores 34 of the guide bar 30. The hydraulics of the harvester are activated to first tension the bar (force $F_1$ in FIG. 7) and then to clamp the block 48 to base 46 (force $F_2$ acting against the cylinder 70 in FIG. 4) to complete the installation of the guide bar 30. Removal of the guide bar 30 also requires the removal of the pins 50 (60) from the sliding block 48. In a typical fashion the pins 50 (60) are removed after the clamping force $F_2$ to the cylinder 70 has been released. The chain is then removed allowing the bar 30 to be removed from the sliding block 48.

One of the concerns with the above arrangement is the possibility that either one or both of the pins 50 (60) will not be installed when the guide bar 30 is fitted to the harvester. The pins, when installed, provide the necessary support for the guide bar to prevent center cracking or other damage due to the forces applied to the bar during a cutting operation.

FIG. 3 illustrates a guide bar 38 that is particularly suited for the use in the tree harvester of FIG. 2. The guide bar 38 has an open ended center slot 40 that will receive the shoulder portion 56 of the sliding block 48 when installed on the harvester. The guide bar 38 has open ended slots 42 in its tail portion with a slot 42 positioned on each side of the center slot 40. The open ended slots 42 will receive and be in abutment with the pins 50 (60) of the sliding block 48 when the bar 38 is installed on the harvester. The pins 50 (60) never have to be removed for mounting the bar of FIG. 3.

FIGS. 4 and 5 illustrate two different mounting block arrangements for mounting a guide bar to the harvester of FIG. 2. Basically the difference between the mechanism of FIG. 4 and the mechanism of FIG. 5 is that the mechanism of FIG. 4 uses long pins 50 which extend through the guide bar 38 and are further supported in the bores 54. The pins 60 of the sliding block 48 of FIG. 5 installed in the bores 52 extend into and through but not beyond the guide bar 38. In either arrangement, a shoulder portion 56 of the sliding block 48 is sized to fit in the center slot 40 of the guide bar 38.

With reference to FIG. 7 and the tensioning and clamping of the bar 38 relative to the power head, the sliding block 48 is forcibly moved ($F_1$) away from the drive sprocket S by known hydraulic mechanism to provide tension on the saw chain entrained around the guide bar 38 and the drive sprocket. When properly tensioned, the sliding block 48 is laterally movable (arrow 72 as viewed in FIG. 4) toward the base 46 by the force of cylinder 70 as indicated by arrow $F_2$. This action clamps block 48 and guide bar 38 to the base member 46 and thereby locks the position of the bar 38 relative to the sprocket S. The bar tensioning force $F_1$ may then be released and the bar and sprocket will be retained in the tensioned relationship.

The design of the guide bar 38 permits the ready installation and removal of the guide bar 38 from the tree harvester. One distinct advantage of the arrangement of the guide bar 38 is that neither of the pins 50 (60) need be removed from the sliding block 48 to accomplish the installation or the removal of the guide bar 38. Accordingly, it will be appreciated that threaded pins 50 (60) can be replaced with permanently installed, non-threaded pins 50' as illustrated in FIG. 6.

Removal of the guide bar 38 is also easily and readily accomplished. The clamping action of cylinder 70 is released, permitting the sliding block 48 to move toward the drive sprocket S thus relieving the tension of the saw chain entrained around the drive sprocket and the guide bar 38. The movement of the sliding clamp 48 toward the drive sprocket is sufficient to provide enough slack in the saw chain to allow the saw chain to be removed from the guide bar 38. The guide bar 38 is then simply slid off the pins (50, 60 or 50') and the shoulder 56 of the sliding block 48.

Those skilled in the art will recognize that modifications and variations may be made without departing from the true spirit and scope of the invention. One such modification is the provision of but one of the slots 42. One side of the bar is more highly stressed than the other and if the bar is designed non-symmetrical, one slot and holding bolt may be determined to be sufficient. The invention is therefore not to be limited to the embodiments described and illustrated but is to be determined from the appended claims.

I claim:

1. A tree harvester comprising:

a tree harvester boom and a chain saw mounted on the distal end of the boom;

said chain saw including a power head having a drive sprocket, an elongated guide bar having a nose end and a tail end, the tail end mounted adjacent to the drive sprocket, and a saw chain loop surrounding the drive sprocket and guide bar; and a mounting apparatus mounting the bar to the harvester, said mounting apparatus including a base member and a sliding block slidably mounted to the base member, a power source slidably positioning the block relative to the base member and a clamp member selectively clamping the sliding block in a fixed position relative to the base member, said mounting apparatus including said sliding block having a boss and at least one pin at one side of the boss, said bar having a center slot open to the tail end for slidably receiving the boss and a pin receiving slot adjacent the tail end and open to the tail end for receiving said pin, said bar as mounted to the block being slidably movable with said block whereby positioning of the block thereby positions the bar relative to the sprocket for tensioning the saw chain, said pin and boss as positioned in said center slot and pin receiving slot cooperatively resisting a bar splitting force applied during cutting with the chain saw.

2. A tree harvester as defined in claim 1 wherein the sliding block has a second pin at the other side of the boss and said bar has a second pin receiving slot for receiving said second pin.

3. A tree harvester as defined in claim 2 wherein the pins are fixedly secured to the sliding block.

4. A tree harvester as defined in claim 1 wherein the pin is received in said pin receiving slot and is positioned against the closed end of the slot and as so positioned is at the tail end of the bar.

5. A tree harvester as defined in claim 1 wherein at least one of the pin and boss is positioned at a closed end of the respective slot for providing the slidable movement with said block, and said clamp member clamping the bar and block to the base member.

6. A tree harvester as defined in claim 5 wherein the boss is integral with the block and elongated in the center slot to resist pivoting.

7. A tree harvester comprising:
  a tree harvester boom and a chain saw mounted on the distal end of the boom;
  said chain saw including a power head having a drive sprocket, an elongated guide bar having a nose end and a tail end, the tail end mounted adjacent to the drive sprocket, and a saw chain loop surrounding the drive sprocket and guide bar;
  a mounting apparatus mounting the bar to the harvester, said mounting apparatus including a mounting block, one of said sprocket and mounting block movable relative to the other for mounting and tensioning the saw chain loop, a power source slidably positioning said one of said sprocket and mounting block and a clamp member selectively clamping said one end of said sprocket and mounting block in a fixed position relative to the other; and
  said guide bar having a thickness, a width and a length and a plurality of slots projected from the tail end lengthways along the guide bar, said mounting block having a separation between block portions for receiving the bar thickness, and a plurality of projections extended between the block portions cooperatively arranged and configured to match the slots in the bar, the bar being insertable into the block separation between the block portions for seating of the guide bar slots onto the projections.

8. A tree harvester comprising:
  a tree harvester boom and a chain saw mounted on the distal end of the boom;
  said chain saw including a power head having a drive sprocket, an elongated guide bar having a nose end and a tail end, the tail end mounted adjacent to the drive sprocket, and a saw chain loop surrounding the drive sprocket and guide bar;
  a mounting apparatus mounting the bar to the harvester, said mounting apparatus including a mounting block, one of said sprocket and mounting block movable relative to the other for mounting and tensioning the saw chain loop, a power source slidably positioning said one of said sprocket and mounting block and a clamp member selectively clamping said one end of said sprocket and mounting block in a fixed position relative to the other;
  said mounting block having a separation defining a narrow passageway through the block and a plurality of ridged projections spanning the separation, said tail end of the guide bar configured for slidable insertion into the passageway of the block and around and past said projections, said configuration defining at least one tail end portion having upper and lower opposed edges that are engaged by a pair of said projections.

* * * * *